Dec. 13, 1955  F. BAINES  2,726,680
HYDRAULIC VALVE ASSEMBLY
Filed Oct. 14, 1952

Inventor:-
Frederick Baines
By: William E. Bayly
Attorney.

United States Patent Office 2,726,680
Patented Dec. 13, 1955

2,726,680

HYDRAULIC VALVE ASSEMBLY

Frederick Baines, Ilford, England, assignor to The Plessey Company Limited, Ilford, England, a British company Application October 14, 1952, Serial No. 314,710

3 Claims. (Cl. 137—621)

This invention relates to a hydraulic valve assembly.

An object of the invention is to provide a hydraulic valve assembly which consists of a valve body having a conduit for the admission of pressure liquid which communicates with a by-pass containing a spring loaded relief valve leading to low pressure, said valve is adapted to close the by-pass until the pressure in the system reaches a predetermined value, when the valve operates as a relief valve; a non-return valve containing a lowering valve is provided in the conduit and is so arranged that the cross-sectional area of the lowering valve is less than that of the non-return valve whereby the pressure in the system can be released, or the load supported by the hydraulic system can be lowered, with a smaller applied force than that required if the force were applied to the non-return valve.

Another object of the invention is that a mechanism, for example a lever, is provided which is operatively connected to the relief valve and lowering valve respectively whereby these said valves can be actuated separately.

A further object of the invention is that means may be associated with the lowering valve for the automatic variation of the rate of discharge of pressurised liquid and hence the rate at which the load is lowered.

The invention will now be described with reference to the accompanying drawings in which—

Figure 1:
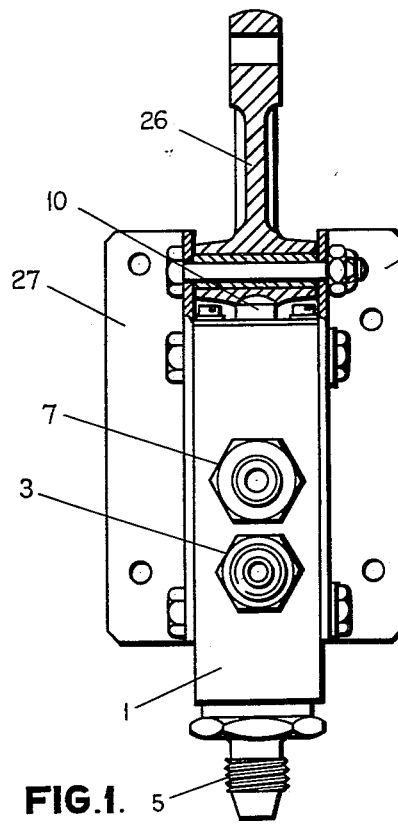
Figure 2:
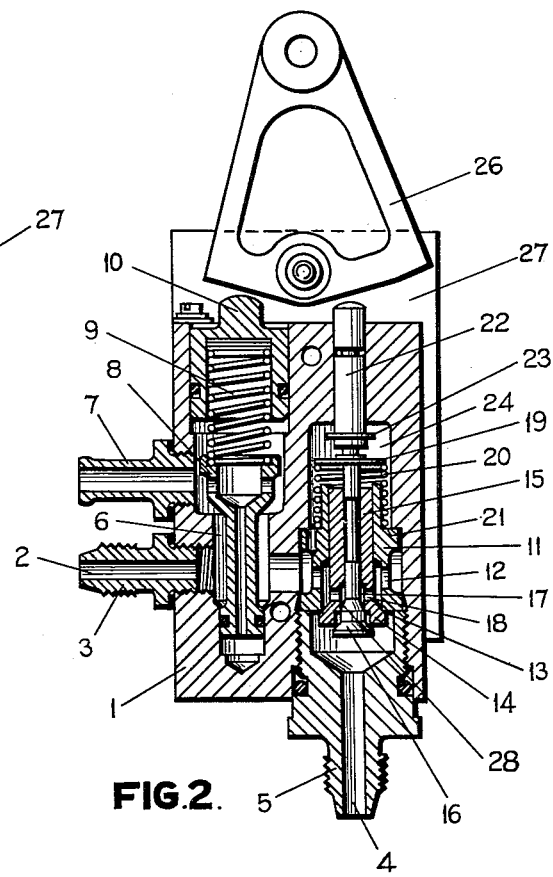
Figure 3:
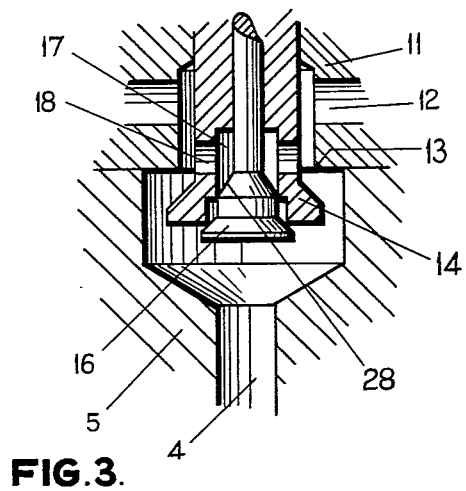
Figure 4:
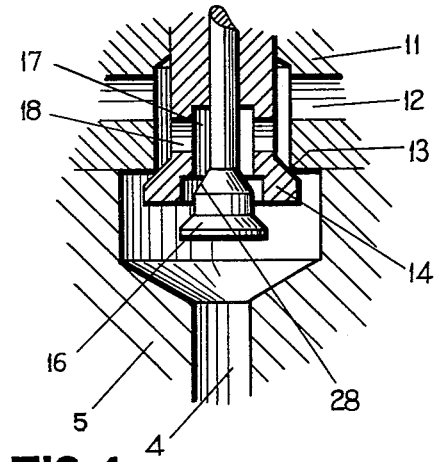

Fig. 1 is an elevation partly in section of a preferred form of hydraulic valve, Fig. 2 is a section partly in elevation at right angles to Fig. 1 and Figs. 3 and 4 are details of the valve assembly unit.

Referring to the drawings:

A valve body 1 has a conduit 2 in which is screwed an inlet union 3 intended to be coupled to a pressure liquid supply and the outlet 4 has a threaded unit 5 for connecting to a hydraulic ram or other piece of hydraulic equipment. A by-pass 6 is provided in said valve body 1 which communicates with the conduit 2 and has a union 7 screwed thereto which is adapted to be connected to a low pressure supply e. g. a sump.

A relief valve 8 is mounted in the by-pass 6 loaded by a spring 9 having a depressible cup member 10 at the outer end which projects above the surface of the valve body. In the neutral position, the relief valve 8 is open permitting the liquid to discharge freely to low pressure.

A valve assembly unit, comprises a sleeve 11 with radial ports 12 and a valve seating 13, a non-return valve 14 with a hollow stem 15 is mounted in the sleeve 11, and a lowering valve 16 of smaller cross sectional area than the non-return valve 14 is located in the non-return valve 14. The non-return valve 14 is formed with an annulus 17 and radial apertures 18, which communicate with the radial ports 12 in sleeve 11.

A collar 19 is fixed to the stem of the lowering valve 16 and a helical spring 20 which encircles the rear end of the sleeve abuts against an external flange 21 integral with said sleeve 11 and the collar 19, whereby the lowering valve 16 is normally closed.

A plunger 22 fitted with a washer 23 is removably connected to the stem of the lowering valve 16.

The valve body 1 is formed with a bore indicated by numeral 24 for accommodating the valve assembly unit. To fit said unit, the union 5 is removed, the valve assembly unit is then inserted in the bore 24, when the plunger 22 will project above the surface of the valve body 1 and the union 5 is finally replaced, as shown in Fig. 2.

A cam lever 26 is pivotally mounted to the brackets 27, which in turn are secured to the valve body, as shown in Fig. 1. Said lever 26 is situated above the cup 10 and plunger 22 in such a manner that when the lever 26 is turned anti-clockwise, the cup 10 is depressed compressing spring 9 thereby closing the relief valve 8 to shut off the flow of liquid to the low pressure side. At this instant pressure liquid is diverted through the radial ports 12 causing the non-return valve 14 to open and occupy the position as shown in Fig. 3. Assuming the union 5 is connected by suitable piping to hydraulic equipment, pressure liquid then operates same. When the hydraulic equipment has been supplied with pressure liquid to its maximum capacity, the relief valve 8 will lift against the load of spring 9 and the pressure liquid from the supply is passed to low pressure. When the lever 26 is released, non-return valve 14 reseats, locking the hydraulic circuit to the ram or other piece of hydraulic equipment. .Simultaneously the spring 9 is unloaded permitting free discharge to low pressure.

To release the hydraulic equipment from pressure, the cam lever 26 is moved in a clockwise direction in order to depress the plunger 22 and thereby open the lowering valve as shown in Fig. 4. Thus the lowering of the hydraulic load can be controlled as desired, with a relatively small applied force by reason of the small cross sectional area of the lowering valve head.

The lowering valve 16 is formed with a taper 28 immediately at the rear of the valve seating so that movement of the valve enables a variation of the rate of discharge of pressurised liquid to be made and thus the rate at which the load is lowered. For example, in the case of an hydraulic ram, the rate of lowering and the amount of lowering can be regulated by the operator.

I claim:

1. In a hydraulic valve assembly the combination of a casing having a high pressure inlet and outlet for circulating fluid under pressure and an intersecting bypass with an outlet for the discharge of fluid to low pressure, a relief valve for controlling the bypass, said valve being normally spring-biased to closed position and adapted to be opened by pressure of the circulating fluid, a pair of telescopic valve members, the outer valve normally closing the high pressure outlet, the inner valve of smaller cross-sectional area than the outer valve member and normally closing a passage in the outer valve member connecting the inlet side thereof with the outlet side, a cam pivotally mounted on said casing and movable to a first position to engage the relief valve spring to compress the same and close said valve to cause diversion of the pressure fluid from said bypass to said outer valve member to open the same in response to said pressure and movable to a second position to engage the inner telescopic valve to open the same for relieving the stored pressure.

2. In a hydraulic valve assembly the combination of a casing having a high pressure inlet and outlet for circulating fluid under pressure and an intersecting bypass with an outlet for the discharge of fluid to low pressure, a relief valve for controlling the bypass and being normally spring-biased to closed position and movable to open position against said spring by the pressure of the circulating fluid, a pair of telescopic valve members, the outer member having radial ports connecting the inlet side of said valve with a passage in said valve communicating with the outlet side thereof, said outer member normally closing said high pressure outlet, the inner valve member of smaller cross-sectional area than the outer valve member and normally closing said passage in the outer valve member, a cam pivotally mounted in said housing and movable to a first position to engage the relief valve spring to compress the same and close said valve to cause diversion of the pressure fluid from the bypass to the outer valve member to open the same in response to said pressure and movable to a second position to engage the inner telescopic valve to open the same to relieve the stored pressure through said passage and said radial ports in said outer valve member.

3. In a hydraulic valve assembly the combination of a casing having a high pressure inlet and outlet for circulating fluid under pressure and an intersecting bypass with an outlet for the discharge of fluid to low pressure, a relief valve for controlling the bypass, said valve being normally spring-biased to closed position and adapted to be opened by pressure of the circulating fluid, a pair of telescopic valve members, the outer member having a passage with radial ports communicating said high pressure outlet with said bypass, said outer member normally closing said outlet and being operable by high pressure fluid acting thereon to open said outlet, the inner valve of smaller cross-sectional area than the outer valve member and normally closing said passage in said outer valve member, a cam pivotally mounted in said housing and movable to a first position to engage the relief valve spring to compress the same and close said valve to cause diversion of the pressure fluid from said bypass to said outer member and movable to a second position to engage said inner valve member to open the same to discharge stored pressure through said passage and said radial ports to said bypass.

References Cited in the file of this patent

UNITED STATES PATENTS

| | | |
|---|---|---|
| 856,655 | McMillin | June 11, 1907 |
| 1,610,811 | Nordstrom | Dec. 14, 1926 |
| 2,438,389 | Edge | Mar. 23, 1948 |
| 2,477,237 | Carr | July 26, 1949 |
| 2,527,823 | Karlsson | Oct. 31, 1950 |